(12) United States Patent
Robert et al.

(10) Patent No.: US 7,635,165 B2
(45) Date of Patent: Dec. 22, 2009

(54) VEHICLE SEAT STRUCTURE AND SEAT COMPRISING SUCH A STRUCTURE

(75) Inventors: Jacques Robert, Marcoussis (FR); Richard Farnault, Arpajon (FR); Christophe Aufrere, Montlhery (FR)

(73) Assignee: Faurecia Sieges d' Automobile, Nanterre (FR)

( * ) Notice: Subject to any disclaimer, the term of this patent is extended or adjusted under 35 U.S.C. 154(b) by 11 days.

(21) Appl. No.: 11/969,574

(22) Filed: Jan. 4, 2008

(65) Prior Publication Data
US 2008/0164743 A1    Jul. 10, 2008

(30) Foreign Application Priority Data
Jan. 9, 2007   (FR) .................................. 07 00130

(51) Int. Cl.
*A47C 7/02* (2006.01)
(52) U.S. Cl. ................. 297/452.18; 297/452.2
(58) Field of Classification Search ............ 297/452.18, 297/452.2
See application file for complete search history.

(56) References Cited

U.S. PATENT DOCUMENTS

| | | | |
|---|---|---|---|
| 4,493,505 A * | 1/1985 | Yamawaki et al. | 297/452.18 |
| 6,347,836 B1 | 2/2002 | Hayotte | |
| 6,352,311 B1 | 3/2002 | Hayotte | |
| 7,066,552 B2 * | 6/2006 | Yoshida | 297/452.18 X |

FOREIGN PATENT DOCUMENTS

| | | |
|---|---|---|
| DE | 20 2004 019 560 U1 | 3/2005 |
| EP | 1 287 972 A1 | 3/2003 |
| FR | 2 786 743 A1 | 6/2000 |
| FR | 2 793 745 A1 | 11/2000 |

OTHER PUBLICATIONS

French Search Report for Priority Application No. FR 0700130, Form FR237, Jan. 2006.

* cited by examiner

*Primary Examiner*—Anthony D Barfield
(74) *Attorney, Agent, or Firm*—Miller Matthias & Hull

(57) ABSTRACT

Vehicle seat structure comprising first and second metal sections that extend substantially parallel to one and the same plane in two different directions and that form a junction where the first and second sections are welded together. The first section comprises a cut-out into which the second section is fitted.

16 Claims, 5 Drawing Sheets

VEHICLE SEAT STRUCTURE AND SEAT COMPRISING SUCH A STRUCTURE

CROSS-REFERENCE TO RELATED APPLICATION

This application claims priority under the Paris Convention to French Patent Application No. 07 00130 filed 9 Jan. 2007, the entire disclosure of which is incorporated herein by reference.

FIELD OF THE DISCLOSURE

The present invention relates to vehicle seat structures and to seats comprising such structures.

More particularly, the invention relates to a vehicle seat structure comprising at least first and second metal sections that extend substantially parallel to one and the same plane in two different directions and that form a junction where said first and second sections are welded together, said first and second sections being attached to a base substantially parallel to said plane.

BACKGROUND OF THE DISCLOSURE

Document DE-U-20 2004 019560 gives an example of such a vehicle seat structure.

SUMMARY OF THE DISCLOSURE

The particular object of the present invention is to reinforce the seat structure.

Accordingly, according to the invention, a seat structure of the kind in question is characterized in that the first section comprises at least one cut-out into which the second section is fitted.

Thanks to this fitting, the strength of the seat structure is reinforced particularly with respect to the extreme forces sustained in the event of an accident.

In preferred embodiments of the invention, it is possible, where necessary, also to use one and/or other of the following arrangements:

- the second section is fitted with clearance into the cut-out of the first section. (The clearance in question particularly allows the structure to be assembled more easily and prevents the clicking noises when the vehicle is running. It will be noted that, despite this clearance, the fitting makes it possible to ensure that the assembly of the structure retains a certain integrity for very high forces that would be likely to break the weld);
- the first and second sections comprise respectively at least first and second assembly faces substantially parallel to said plane, the weld being made flat-to-flat on said first and second assembly faces (the weld can be made between these two faces or between each of these faces and an intermediate part), said clearance being arranged at least perpendicular to said plane;
- the first assembly face is welded to the second assembly face;
- the first section has a substantially U-shaped cross section comprising a web and two side flanges extending from the web to an end edge (the web may if necessary be reduced to the zone of junction between the two flanges), said cut-out being arranged in the side flanges of the first section and the end edge of at least one of the two side flanges being extended laterally by a flap fixedly attached to said first assembly face;
- said flap extends outwards from the end edge of the side flange of the first section and said flap is extended laterally outwards by a ledge that extends towards the web of the first section and that comprises said first assembly face, which is welded flat-to-flat to the second assembly face;
- the flap of the first section is parallel to said plane and is welded to a metal sheet extending substantially parallel to said plane and forming a base for said vehicle seat structure;
- the end edges of the two side flanges are extended laterally outwards by two flaps parallel to said plane that are themselves extended laterally outwards by two ledges that extend towards the web of the first section, which is welded flat-to-flat to a second assembly face;
- the second section has a substantially U-shaped cross section, comprising a web and two side flanges extending from the web to an end edge (the web may if necessary be reduced to the zone of junction between the two flanges), the end edge of at least one of the two side flanges of the second section being extended laterally by a flap fixedly attached to said second assembly face, the web of the second section being placed towards the web of the first section;
- said flap of the second section extends parallel to said plane and the second assembly face belongs to the flap of the second section;
- the flap of the second section is welded to a metal sheet extending substantially parallel to said plane and forming a base for said vehicle seat structure;
- the end edges of the two side flanges of the second section are extended laterally outwards by two flaps that extend parallel to said plane and each comprise a second assembly face, each flap of the second section also being welded to a metal sheet extending substantially parallel to said plane and forming a base for said vehicle seat structure;
- the first section has a substantially U-shaped cross section comprising a web and two side flanges extending from the web to an end edge, said cut-out being arranged in the side flanges of the first section and the web of the first section comprising a central reinforcement that extends between the two side flanges of the first section and that forms said first assembly face, the second section comprising a web that is adjacent to the web of the first section and that forms said second assembly face;
- the first and second assembly faces are welded separately to a metal sheet extending substantially parallel to said plane and forming a base for said vehicle seat structure;
- the first and second sections are substantially perpendicular to one another.

Furthermore, a further subject of the invention is a vehicle seat comprising at least one portion furnished with a structure as defined above. If necessary, the seat portion in question is the back.

BRIEF DESCRIPTION OF THE DRAWINGS

Other features and advantages of the invention will appear during the following description of three of its embodiments, given as non-limiting examples, with respect to the attached drawings.

In the drawings.

MORE DETAILED DESCRIPTION

In the various figures, the same reference numbers indicate identical or similar elements.

Figure 1:
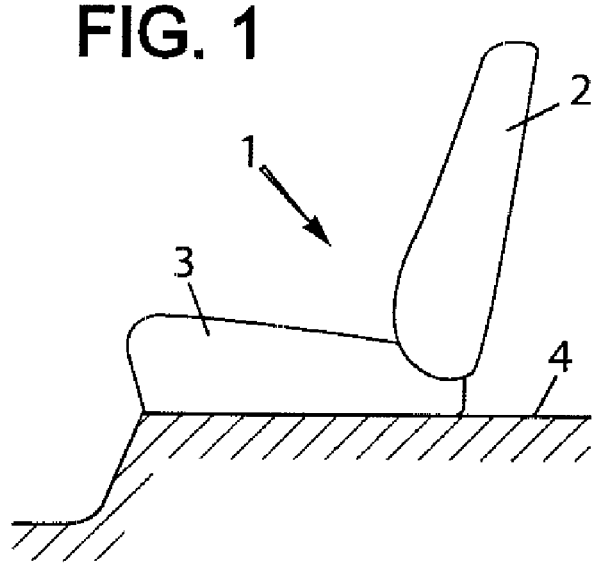
FIG. 1 is a schematic view of a vehicle seat including a seat structure according to one embodiment of the invention.

FIG. 1 represents a motor vehicle seat 1, for example a vehicle rear bench seat, comprising a back 2 and a squab 3 mounted on the bodywork 4 of the vehicle. The back 2 may be made for example in two portions, so that these two portions can be folded down separately from one another.

Figure 2:
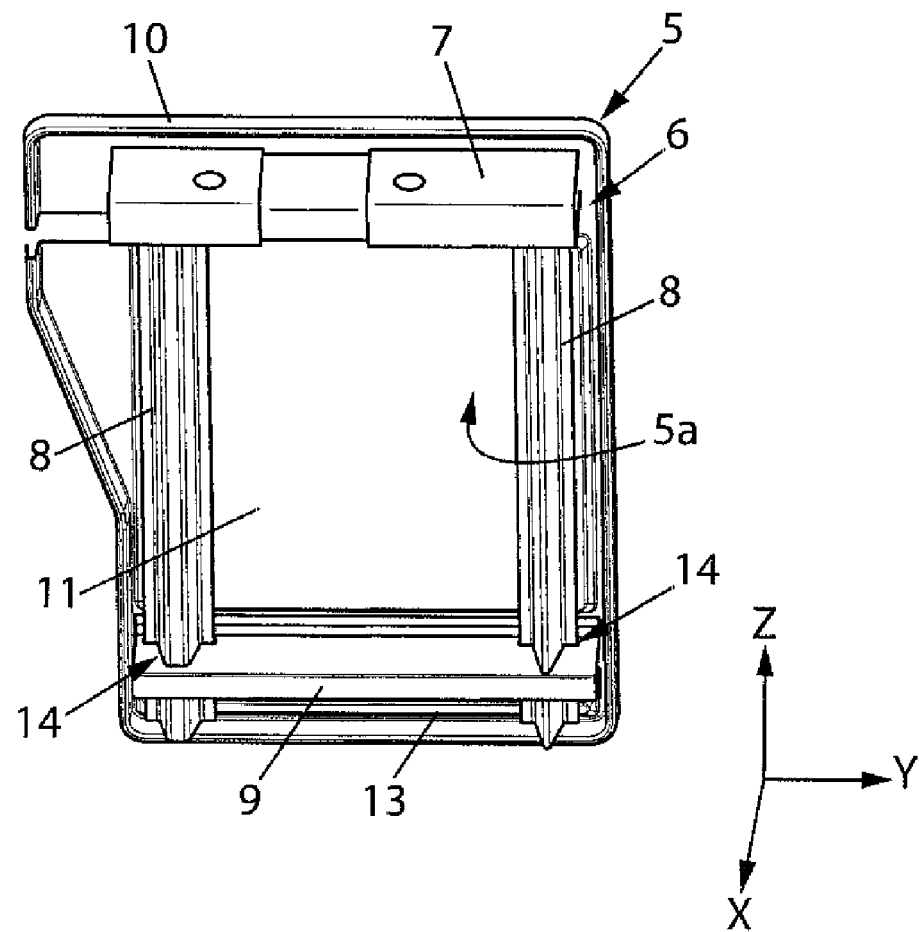
FIG. 2 is a view in perspective of a portion of the structure of the seat back of FIG. 1, in a first embodiment of the invention.
Figure 3:
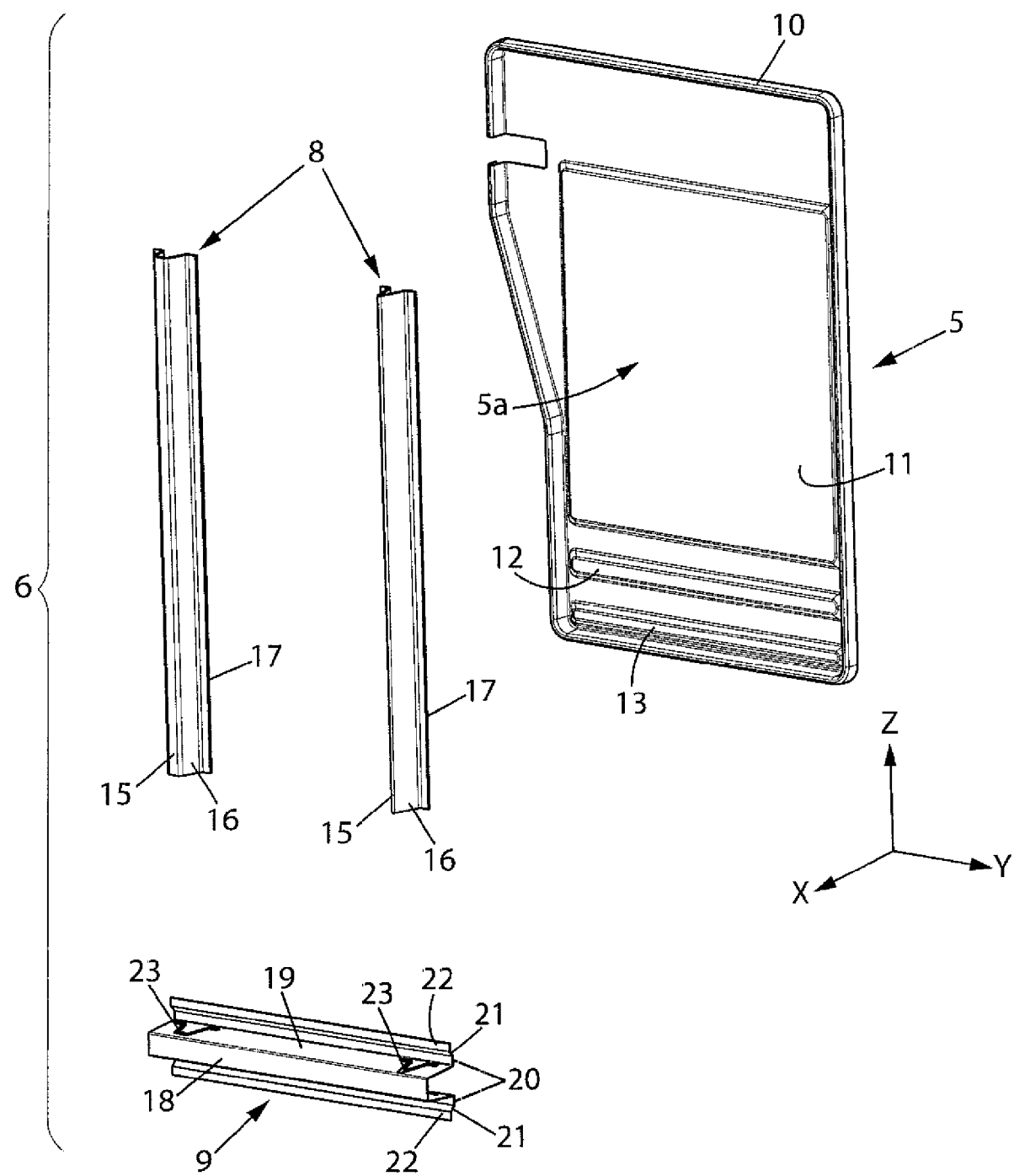
FIG. 3 is an exploded view of the structure of FIG. 2.

FIGS. 2 and 3 represent the metal structure 2a of one of the two portions of the back 2, which structure comprises a metal sheet base 5 and a frame 6 formed by an assembly of sections comprising for example a top cross member 7 placed substantially horizontally, uprights 8 extending substantially vertically (in the position of use of the back 2), and a bottom cross member 9 extending substantially horizontally.

The metal sheet base 5 may be a thin steel sheet, with a thickness lying for example between 0.5 and 0.8 mm, particularly of the order of 0.6 mm. Said metal sheet base 5 extends along a general plane YZ, in a frame of reference X, Y, Z, in which the Y axis corresponds to the transverse horizontal direction of the vehicle, the Z axis is a substantially vertical axis parallel to the general plane of the back 2 and the X axis is perpendicular to the Y and Z axes and oriented substantially towards the front of the vehicle.

The metal sheet base 5 may be formed for example by stamping, so as to have in particular a stiffening raised rim 10, a flat stamped central portion 11, protruding slightly on the front face 5a of the metal sheet base and two horizontal bottom ribs 12, 13 also protruding on the front face 5a of the metal sheet base and extending longitudinally parallel to the transverse axis Y, in the vicinity of the bottom cross member 9, as will be explained below. The ribs 12, 13 preferably have a flat bottom situated in one and the same plane as the stamped central portion 11.

Furthermore, the uprights 8 and the bottom cross member 9 are generally U-shaped metal sections that are open towards the metal sheet base 5 and that are welded flat onto said metal sheet base and welded together at their junctions 14. The sections 8, 9 extend substantially perpendicularly to one another in the example shown.

Figure 4:
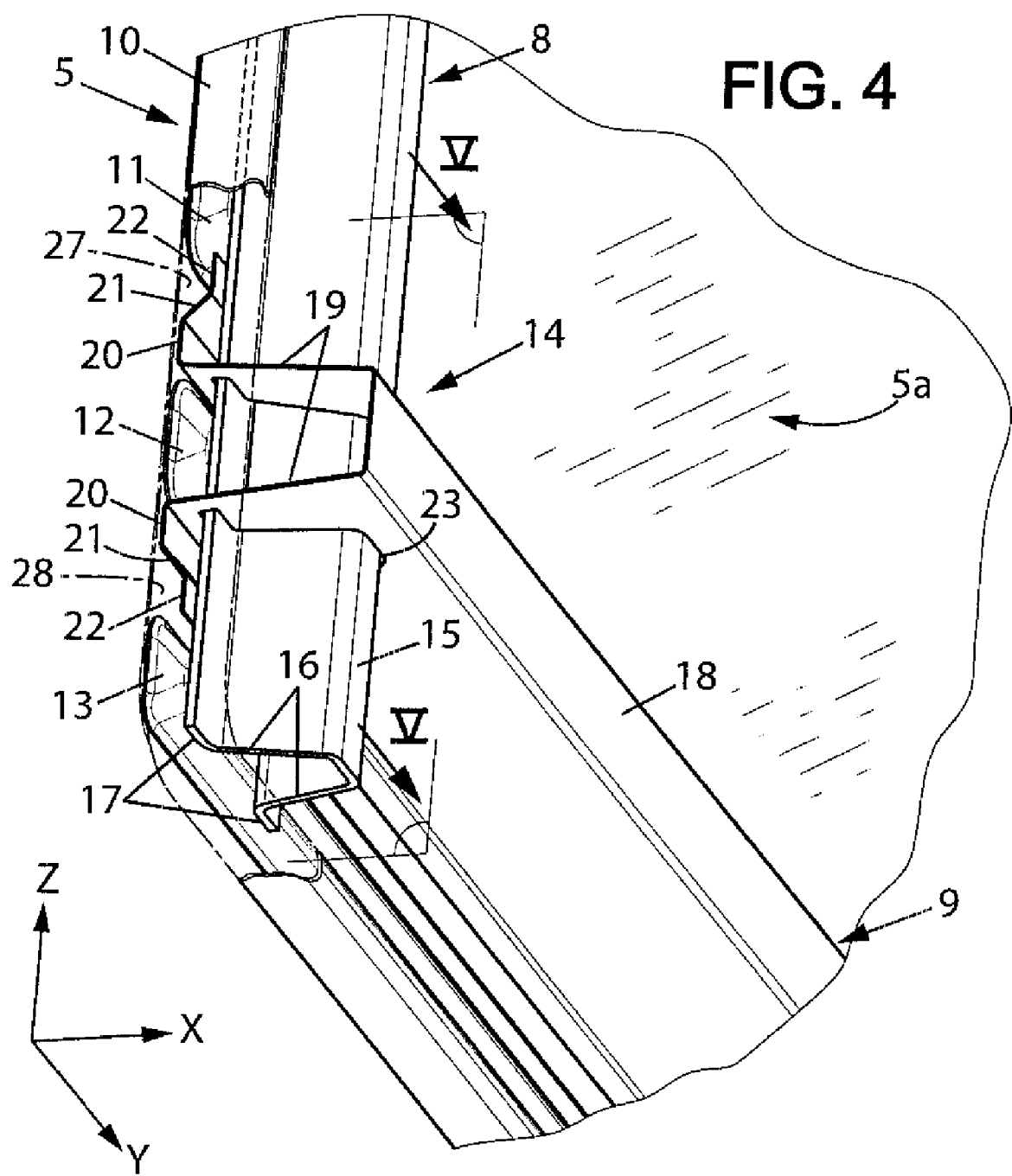
FIG. 4 is a detail view, partially cut away, of the structure of FIGS. 2 and 3.

As shown in greater detail in FIGS. 3 and 4, the uprights 8 each comprise a substantially flat web 15, extending in the plane Y, Z and extended by two side flanges 16 extending towards the metal sheet base 5 while diverging. The web 15 could if necessary be reduced to a simple zone of junction between the flanges 16. The side flanges 16 are themselves extended laterally outwards respectively by two flaps 17 that extend parallel to the plane Y, Z.

The bottom cross member 9, for its part, also has a generally flat shaped web 18, which extends parallel to the plane Y, Z and which is extended by two side flanges 19 extending towards the metal sheet base 5 while diverging. The web 18 could if necessary be reduced to a simple zone of junction between the flanges 19. Each side flange 19 is itself extended at its end edge closest to the metal sheet base 5 by two flaps 20 extending laterally outwards parallel to the plane Y, Z.

The flaps 20 are extended laterally outwards by two ledges respectively comprising two intermediate walls 21 extending obliquely away from one another and towards the web 18 of the bottom cross member, these intermediate walls 21 themselves being extended laterally outwards by two end faces 22 parallel to the plane Y, Z.

At each junction 14 between the uprights 8 and the bottom cross member 9, the side flanges 19 of the bottom cross member 9 have cut-outs 23, consisting here of slots each following a U-shaped contour, having the same general shape as the cross section of the uprights 8.

The thicknesses of the slots 23 are however greater than the thickness of the metal sheet forming the uprights 8. Therefore, the uprights 8 may be fitted into the slots 23 with a certain clearance at least along the axis X and advantageously also along the transverse axis Y.

It will be noted that the slots 23 could be replaced by other types of cut-out, particularly cut-outs following only the external profile of the uprights 8, these cut-outs then being able, for example, to be hollowed out in their central portion matching the inside of the uprights 8.

Figure 5:
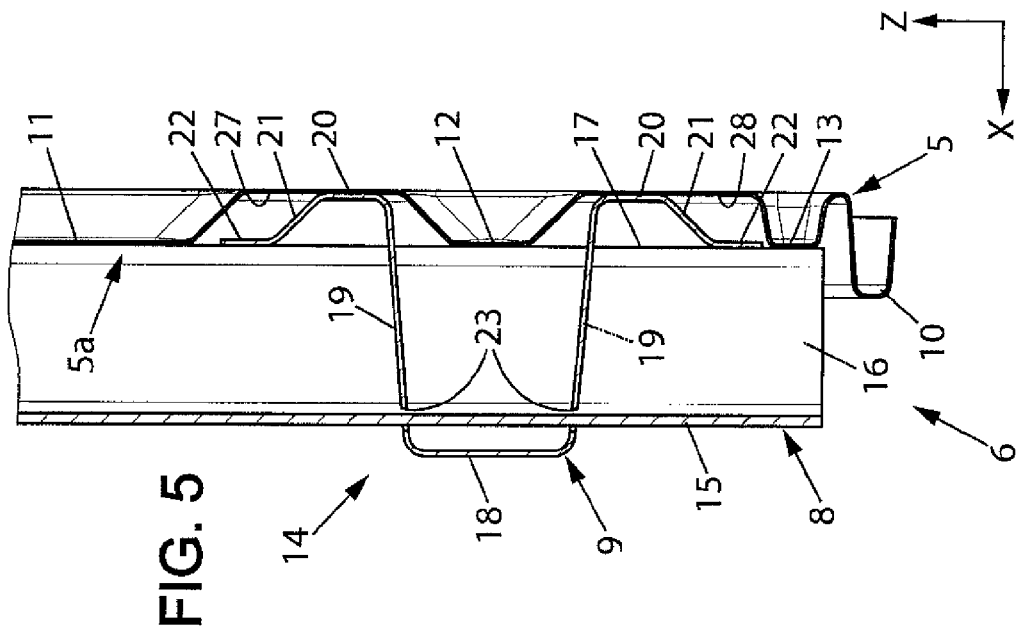
FIG. 5 is a view in section in the plane V-V of FIG. 4.

As shown in greater detail in FIGS. 4 and 5, the clearance of the uprights 18 in the cut-outs 23 of the bottom cross member 9 makes it possible to position the flaps 17 of the vertical uprights against the end faces 22 of the bottom cross member 9, then to weld said flaps 17 with the end faces 22 that therefore form assembly faces welded flat-to-flat. In addition, the clearance of the uprights 8 in the slots 23 prevents the occurrence of clicking noise during the use of the seat 1 that includes the structure 5, 6, particularly when the vehicle in which the seat is mounted is running.

The uprights 8 may be assembled to the bottom cross member 9 by flat position welding, similar to the assembly of the frame 6 to the metal sheet base 5. When the frame 6 is assembled to the metal sheet base 5, the flaps 17 of the uprights 8 are welded flat-to-flat respectively on the front face of the stamped central portion 11 and the ribs 12, 13 of the metal sheet base, while the flaps 20 of the bottom cross member 9 are welded to the front face 5a of the metal sheet base, in grooves 27, 28 one of which is arranged between the stamped central portion and the rib 12 and the other between the ribs 12 and 13.

When the metal sheet base 5 is welded to the sections 8, 9, said metal sheet base is pressed against the flaps 17, 20 of the sections by jacks or other mechanical means which press against the rear face 5b of the metal sheet base and which, thanks to the flexibility of said metal sheet base, slightly deform said metal sheet base so as to take up any manufacturing clearance and ensure that the front face 5a of the metal sheet base makes contact with said flaps 17, 20.

Figure 6:
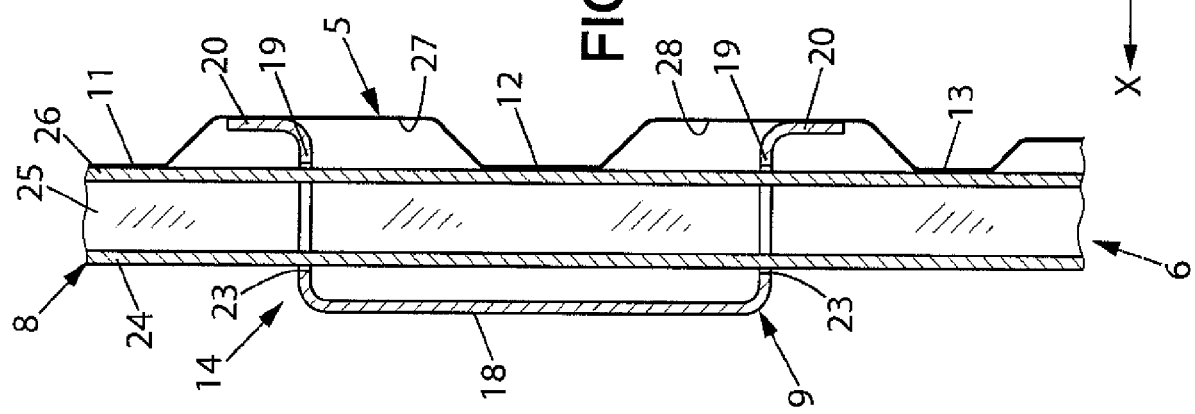
FIG. 6 is a view similar to FIG. 5, in a second embodiment of the invention.

In the second embodiment of the invention, shown in FIG. 6, the uprights 8 are not welded directly to the bottom cross member 9. In addition, the uprights 8 here do not have a U-shaped cross section but a closed cross section, for example a rectangular cross section comprising two walls 24, 26 parallel to the planes Y, Z and two walls 25 parallel to the planes Y, Z. The cut-outs 23 here are hollowed out rectangles and no longer slots, and furthermore, the bottom cross member 9 has a U-shaped section but does not comprise the ledges 21, 22 extending its flaps 20. The metal sheet base 5 furthermore has a shape similar to that already described.

In this second embodiment, the vertical uprights 8 are assembled to the bottom cross member 9 by means of the metal sheet base 5, the wall 26 of the uprights 8 being flat position welded to the stamped central portion 11 and the ribs 12, 13 of the metal sheet base and the flaps 20 being welded in the grooves 27, 28, one being delimited between the stamped central portion 11 and the rib 12 and the other between the rib 12 and the rib 13.

Figure 7:
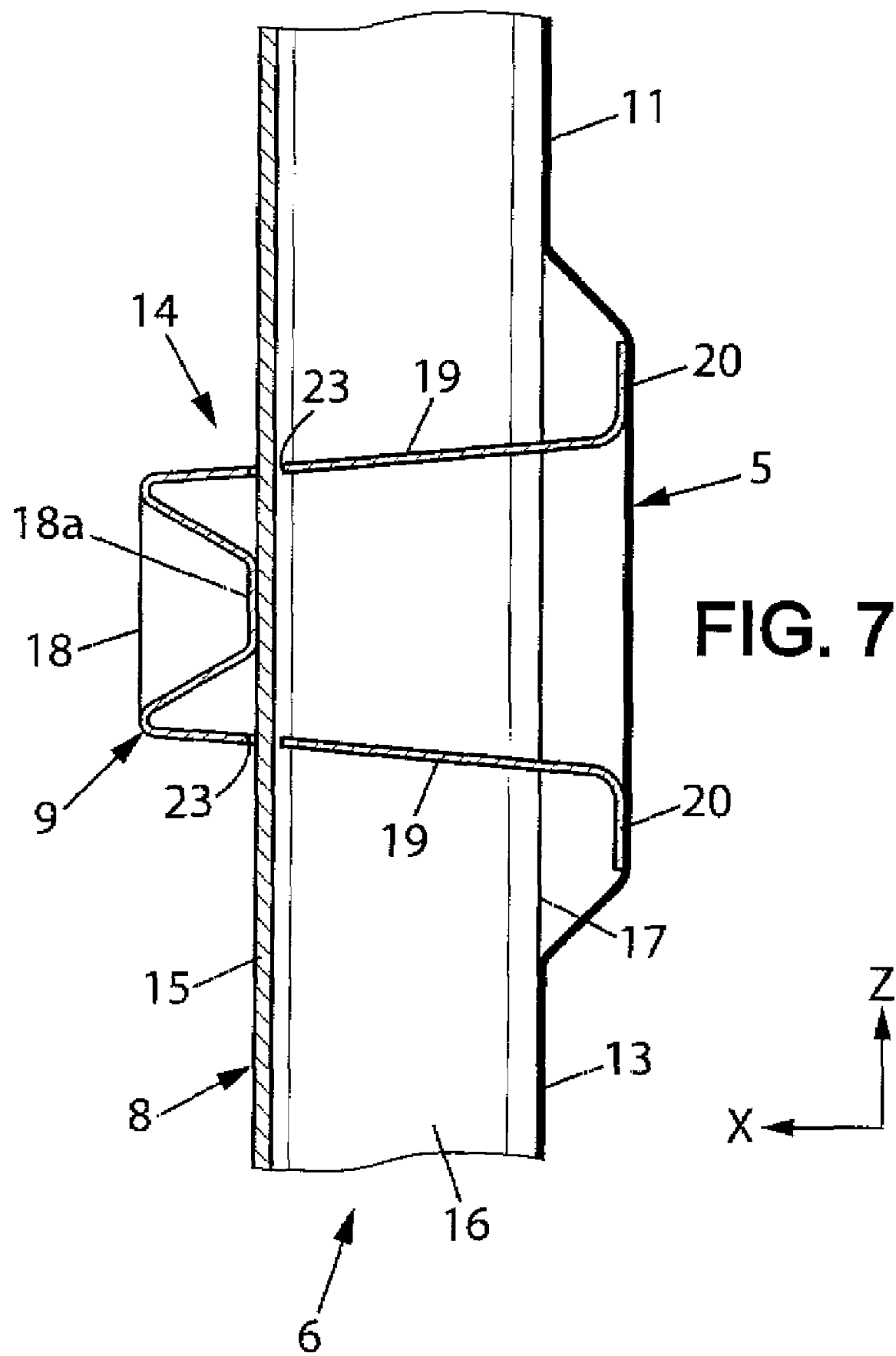
FIG. 7 is a view in section similar to FIG. 5, in a third embodiment of the invention.

Finally, in the third embodiment, that can be seen in FIG. 7, the sections 8, 9 have a shape that is generally similar to that described in the first embodiment and are assembled to the metal sheet base 5 (not shown in FIG. 7) in the same manner as in the first embodiment described above. In this third embodiment, the web 18 of the bottom cross member 9 has, at least at the junctions 14, reinforcements 18a that are stamped towards the inside of the side flanges 19 and each form an assembly face parallel to the plane Y, Z. Each of these reinforcements 18a is pressed into contact against the web 15 of the corresponding upright 8 and welded flat-to-flat against this web. In this third embodiment, the bottom cross member 9 could also comprise, as necessary, the abovementioned ledges 21, 22, in which case the end faces 22 of these ledges could be pressed elastically against the flaps 17 of the uprights 8, if necessary with a certain elastic deformation of the intermediate walls 21 of the ledges 21, 22. Said end faces 22 could therefore also be welded flat-to-flat against the flaps 17 of the uprights 8, as in the first embodiment of the invention.

The invention claimed is:

1. Vehicle seat structure comprising:
   at least first and second metal sections that extend substantially parallel to one and the same plane in two different directions and that form a junction where said first and second sections are welded together, and
   a base substantially parallel to said plane and attached to each of said first and second metal sections,
   wherein the first section comprises at least one cut-out which delimits a rim in said first section, the second section being fitted with clearance in said cut-out, said rim surrounding said second section without contact with said second section.

2. Structure according to claim 1, in which the first and second sections comprise respectively at least first and second assembly faces substantially parallel to said plane, the weld being made flat-to-flat on said first and second assembly faces, said clearance being arranged at least perpendicularly to said plane.

3. Structure according to claim 2, in which the first assembly face is welded to the second assembly face.

4. Structure according to claim 3, in which the first section has a substantially U-shaped cross section comprising a web and two side flanges extending from the web to an end edge, said cut-out being arranged in the side flanges of the first section and the end edge of at least one of the two side flanges being extended laterally by a flap fixedly attached to said first assembly face.

5. Structure according to claim 4, in which said flap extends outwards from the end edge of the side flange of the first section and said flap is extended laterally outwards by a ledge that extends towards the web of the first section and that comprises said first assembly face, which is welded flat-to-flat to the second assembly face.

6. Structure according to claim 4, in which the flap of the first section is parallel to said plane and is welded to a metal sheet extending substantially parallel to said plane and forming the base for said vehicle seat structure.

7. Structure according to claim 6, in which the end edges of the two side flanges are extended laterally outwards by two flaps parallel to said plane that are welded to said metal sheet and that are themselves extended laterally outwards by two ledges that extend towards the web of the first section and that each comprise a first assembly face, which is welded flat-to-flat to a second assembly face.

8. Structure according to claim 4, in which the second section has a substantially U-shaped cross section comprising a web and two side flanges extending from the web to an end edge, the end edge of at least one of the two side flanges of the second section being extended laterally by a flap fixedly attached to said second assembly face, the web of the second section being placed towards the web of the first section.

9. Structure according to claim 8, in which said flap of the second section extends parallel to said plane and the second assembly face belongs to the flap of the second section.

10. Structure according to claim 9, in which the flap of the second section is welded to a metal sheet extending substantially parallel to said plane and forming a base for said vehicle seat structure.

11. Structure according to claim 10, in which the end edges of the two side flanges of the second section are extended laterally outwards by two flaps that extend parallel to said plane and each comprise a second assembly face, each flap of the second section also being welded to a metal sheet extending substantially parallel to said plane and forming a base for said vehicle seat structure.

12. Structure according to claim 3, in which the first section has a substantially U-shaped section comprising a web and two side flanges extending from the web to an end edge, said cut-out being arranged in the side flanges of the first section and the web of the first section comprising a central reinforcement that extends between the two side flanges of the first section and that forms said first assembly face, the second section comprising a web that is adjacent to the web of the first section and that forms said second assembly face.

13. Structure according to claim 2, in which the first and second assembly faces are welded separately to a metal sheet extending substantially parallel to said plane and forming a base for said vehicle seat structure.

14. Structure according to claim 1, in which the first and second sections are substantially perpendicular to one another.

15. Vehicle seat comprising at least one seat portion provided with a structure according to claim 1.

16. Vehicle seat according to claim 15, comprising a back forming said seat portion.

* * * * *